United States Patent
Nam et al.

(10) Patent No.: US 7,676,002 B2
(45) Date of Patent: Mar. 9, 2010

(54) BLIND DETECTION METHOD AND APPARATUS, AND MOBILE COMMUNICATION RECEIVER HAVING THE SAME

(75) Inventors: Hyun-Suk Nam, Suwon-si (KR); Sang-Woo Kim, Seongnam-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 810 days.

(21) Appl. No.: 11/337,219

(22) Filed: Jan. 20, 2006

(65) Prior Publication Data

US 2006/0176981 A1    Aug. 10, 2006

(30) Foreign Application Priority Data

Feb. 7, 2005  (KR) ............ 10-2005-0011084

(51) Int. Cl.
   *H04L 27/06* (2006.01)
(52) U.S. Cl. ............ 375/340; 375/274; 375/279
(58) Field of Classification Search ............ 375/233, 375/316, 274, 279, 305, 308, 340
   See application file for complete search history.

(56) References Cited

U.S. PATENT DOCUMENTS

| | | | |
|---|---|---|---|
| 6,377,817 B1 * | 4/2002 | Hakaste et al. ............ 455/553.1 |
| 6,400,928 B1 | 6/2002 | Khullar et al. | |
| 7,421,261 B2 * | 9/2008 | Sahlin et al. ............ 455/135 |
| 2002/0106032 A1 * | 8/2002 | Navarro et al. ............ 375/259 |
| 2004/0096012 A1 | 5/2004 | Yang | |
| 2004/0156448 A1 | 8/2004 | Sahlin et al. | |
| 2005/0084040 A1 * | 4/2005 | Stewart et al. ............ 375/324 |

FOREIGN PATENT DOCUMENTS

| | | |
|---|---|---|
| EP | 1489805 | 12/2004 |
| JP | 2003-258926 | 9/2003 |
| WO | 01/52493 | 7/2001 |
| WO | WO0152493 A1 * | 7/2001 |
| WO | WO 02/073915 A1 | 9/2002 |

* cited by examiner

*Primary Examiner*—Chieh M. Fan
*Assistant Examiner*—Freshteh N Aghdam
(74) *Attorney, Agent, or Firm*—F. Chau & Associates, LLC (57) ABSTRACT

In a blind detection apparatus and method capable of determining a modulation mode by comparing the absolute values of the real and imaginary parts of a sequence of intersymbol phase differences between symbols separated from each other at an interval of four symbols (instead of comparing intersymbol phase differences of symbols at an interval of one symbol as in the related art), the symbols being included in a training sequence code of a received normal burst. Therefore, a number of calculations for the blind detection may be decreased e.g., by a factor of four, and as a result, the time for performing the blind detection may be decreased. In addition, the hardware design for the blind detection may be simplified.

30 Claims, 8 Drawing Sheets

| TRAINING SEQUENCE CODE NUMBER | TRAINING SEQUENCE CODE |
|---|---|
| 0 | (0,0,1,0,0,1,0,1,1,1,0,0,0,0,1,0,0,0,1,0,0,1,0,1,1,1) |
| 1 | (0,0,1,0,1,1,0,1,1,1,0,1,1,1,1,0,0,0,1,0,1,1,0,1,1,1) |
| 2 | (0,1,0,0,0,0,1,1,1,0,1,1,1,0,1,0,0,1,0,0,0,0,1,1,1,0) |
| 3 | (0,1,0,0,0,1,1,1,1,0,1,1,0,1,0,0,0,1,0,0,0,1,1,1,1,0) |
| 4 | (0,0,0,1,1,0,1,0,1,1,1,0,0,1,0,0,0,0,0,1,1,0,1,0,1,1) |
| 5 | (0,1,0,0,1,1,1,0,1,0,1,1,0,0,0,0,0,1,0,0,1,1,1,0,1,0) |
| 6 | (1,0,1,0,0,1,1,1,1,1,0,1,1,0,0,0,1,0,1,0,0,1,1,1,1,1) |
| 7 | (1,1,1,0,1,1,1,1,0,0,0,1,0,0,1,0,1,1,1,1,1,1,0,0,0,0) |

BLIND DETECTION METHOD AND APPARATUS, AND MOBILE COMMUNICATION RECEIVER HAVING THE SAME

CLAIM FOR PRIORITY

This application claims priority under 35 U.S.C. §119 of Korean Patent Application No. 2005-11084 filed on Feb. 7, 2005 in the Korean Intellectual Property Office (KIPO), the entire contents of which are herein incorporated by reference.

BACKGROUND

1. Field of the Invention

The present invention relates to digital communication systems, and more particularly to a method and an apparatus for blind detection, for example, used in an EGPRS system, and a wireless communication receiver including the same.

2. Description of the Related Art

Enhanced Data rates for GSM Evolution (EDGE) is a radio-based high-speed mobile data standard that can be integrated into GSM/GPRS and IS-136 networks. Enhanced Data rates for GSM Evolution (EDGE), and a related packet service, i.e. Enhanced General Packet Radio Service (EGPRS), are currently being applied to mobile communication standards, such as Global System for Mobile communications (GSM), General Packet Radio Service (GPRS) and Universal Mobile Telecommunications System (UMTS).

In the EDGE technology, a data rate of a wireless channel varies according to the performance of a receiver. The data (transmission) rate may be varied by modifying a modulation method (modulation mode) and/or an encoding method.

In the modulation method of varying the data rate, a Gaussian Mean Shift Keying (GMSK) modulation mode is used in GSM, and an Eight Phase Shift Keying (8-PSK) modulation mode is used in EGPRS. GSM originally used GMSK modulation and robust channel coding only. To achieve higher data rates in case of good physical channels, GPRS and later EDGE were introduced. In contrast to GPRS, EDGE additionally uses the 8-PSK modulation mode.

Because a base station (transmitter) does not transmit any information about the modulation mode currently being used in the EGPRS, the receiver must perform a blind detection for determining the modulation mode. The training sequence code (TSC) based channel estimation is done before equalization.

The blind detection is a procedure for determining the current modulation mode from received data. The receiver uses a training sequence code (TSC) of a normal burst of the received data to perform the blind detection. In the mobile communication standard GSM/EDGE, the base station can select one of eight training sequence codes 0 through 7 as a midamble (symbols 61 through 86) of the downlink transmitted bursts. (See FIG. 6).

Figure 1:
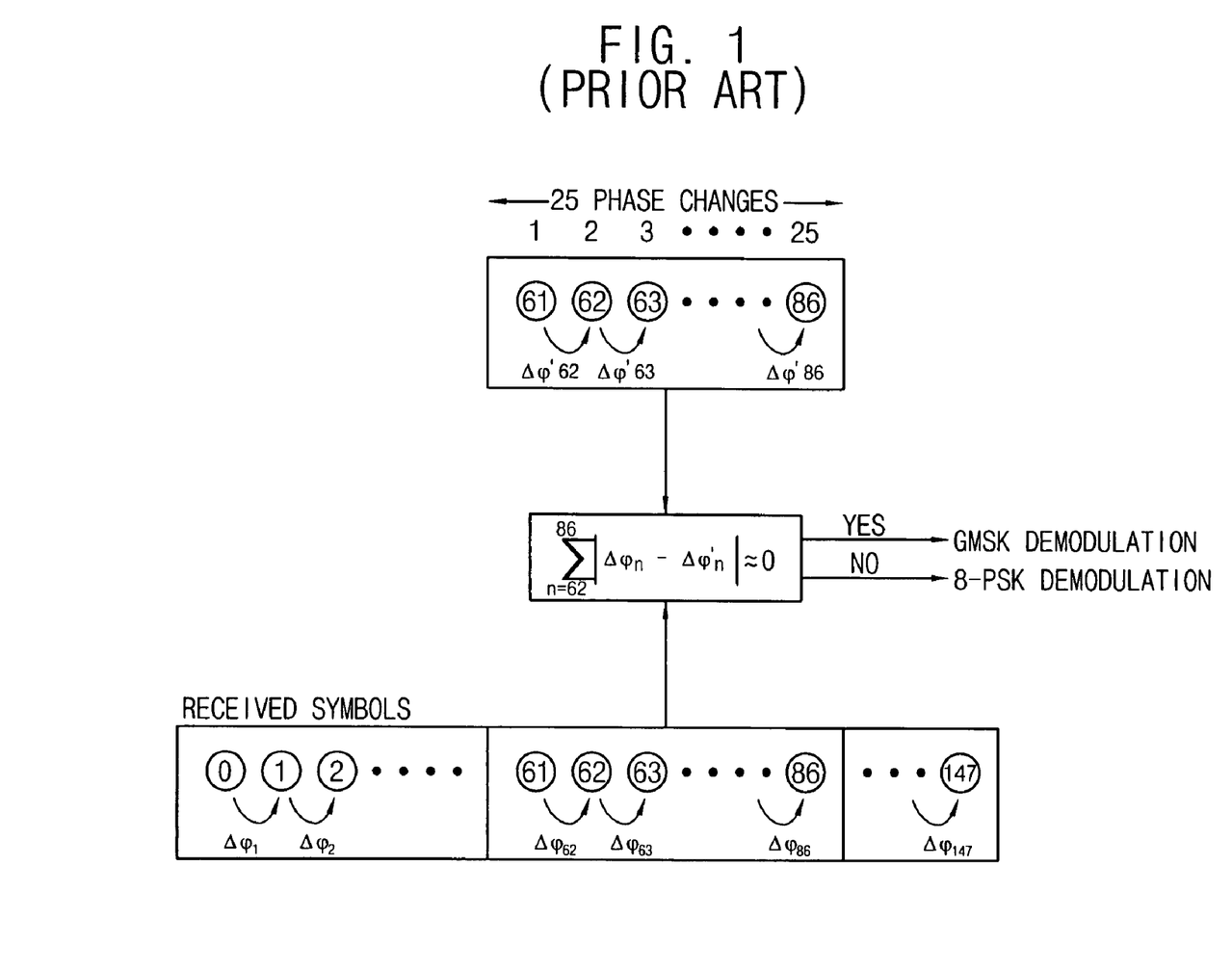
FIG. 1 is a conceptual diagram illustrating a conventional method of blind detection.

FIG. 1 is a conceptual diagram illustrating a conventional method of blind detection.

Referring to FIG. 1, the training sequence code TSC is represented as a symbol 61 through a symbol 86 (among symbols 0 through 147). The receiver stores phase differences $\Delta\phi'_{62}$ through $\Delta\phi'_{86}$ between neighboring symbols in a stored (previously-known) training sequence code (symbol 61 through symbol 86)

Herein, the symbol $\Delta\phi'_{62}$ represents a phase difference between the symbol 62 and the adjacent symbol 61, and the symbol $\Delta\phi'_{86}$ represents a phase difference between the symbol 86 and the symbol 85.

Then, the receiver detects (e.g., measures) phase differences $\Delta\phi_1$ through $\Delta\phi_{147}$ (including $\Delta\phi_{62}$ through $\Delta\phi_{86}$) between neighboring symbols of a current (received) training sequence code.

Assuming that phase differences between neighboring symbols of the received training sequence code are represented by $\Delta\phi'_{62}$ through $\Delta\phi'_{86}$ in a GSMK modulation mode and that phase differences between neighboring symbols of the current (stored) training sequence code are represented by $\Delta\phi'_{62}$ through $\Delta\phi'_{86}$ in a GSMK modulation mode, a sum of absolute values of the phase differences $\Delta\psi'$ and $\Delta\psi$ (between received and stored training sequence codes) satisfies the following Equation 1:

$$\sum_{n=62}^{86} |(\Delta\varphi_n - \Delta\varphi'_n)| \approx 0 \qquad \text{[Equation 1]}$$

However, when the current modulation mode is an 8-PSK modulation mode, the sum of absolute values of the phases differences $\Delta\psi'$ and $\Delta\psi$ (between received and stored training sequence codes) does not satisfy Equation 1.

Therefore, the receiver determines that the current modulation mode is the GMSK modulation mode, (i.e., a GSM mode) when Equation 1 is satisfied, and determines that the current modulation mode is the 8-PSK modulation mode, (i.e., EGPRS mode) when Equation 1 is not satisfied.

Because the conventional blind detection method has to compare the phase differences $\Delta\phi'_{62}$ through $\Delta\phi'_{86}$ between neighboring symbols of the stored (previously-known) training sequence code with the phase differences $\Delta\phi_{62}$ through $\Delta\phi_{86}$ between neighboring symbols of the current (currently received) training sequence code, the receiver performs a large number of calculations, and as a result, requires a long time to perform the blind detection.

SUMMARY OF THE INVENTION

Aspects of the present invention provide a blind detection method capable of reducing the number of calculations performed for a blind detection in a wireless communication receiver.

Aspects of the present invention also provide a blind detection method capable of reducing the number of calculations performed for blind detection in an EGPRS receiver.

Aspects of the present invention also provide a blind detection apparatus capable of reducing the number of calculations performed for blind detection in a wireless communication receiver.

Aspects of the present invention also provide a wireless receiver that includes a blind detection apparatus capable of reducing the number of calculations performed for blind detection.

Some embodiments of the invention provide a method of blind detection of a transmitter's modulation mode for a wireless communication receiver, the method comprising: calculating the intersymbol phase difference between the (m+r)th symbol (e.g., the 61$^{st}$ symbol) and the (m+r+4)th symbol (e.g., the 65$^{th}$ symbol) of a received normal burst; and repeating, q more times, the step of calculating the intersymbol phase difference between an (m+r)th symbol and the (m+r+4)th symbol of a received normal burst, while r is incremented from 0 to q. The integer m is typically 61 (i.e., the mth symbol is the first symbol in a training sequence code) and q is 21 (i.e., the (m+q)th symbol is the last (22$^{nd}$) symbol in a training sequence code). Determining the modulation mode includes comparing the sum of the (q+1) absolute values of the real parts of the calculated intersymbol phase differences with the sum of the (q+1) absolute values of the imaginary parts of the calculated intersymbol phase differences. For example, determining the modulation mode may include determining that the modulation mode is the GMSK modulation mode when each of the (q+1) intersymbol phase differences has a value of about 0 or about π; and determining that the modulation mode is the 8-PSK modulation mode when each of the (q+1) intersymbol phase differences has a value of about π/2 or about −π/2. Determining the modulation mode may include determining that the modulation mode is the GMSK modulation mode when the sum of the (q+1) absolute values of the real parts of the intersymbol phase differences is greater than the sum of the (q+1) absolute values of the imaginary parts of the intersymbol phase differences; and determining that the modulation mode is the 8-PSK modulation mode when the sum of the (q+1) absolute values of the real parts of the intersymbol phase differences is less than the sum of the (q+1) absolute values of the imaginary parts of the intersymbol phase differences. The wireless communication receiver may include an EGPRS (Enhanced General Packet Radio Service) receiver.

In some embodiments of the present invention, a method of blind detection in a wireless communication receiver includes obtaining intersymbol phase differences of a plurality of symbols at intervals of four symbols (where the symbols are included in a training sequence code of a received normal burst) and determining the modulation mode used by the transmitter based on these selected (fewer) intersymbol phase differences.

In some embodiments of the present invention, a blind detection method in an EGPRS receiver includes obtaining intersymbol phase differences of a plurality of symbols at intervals of four symbols (where the symbols are included in a training sequence code of a received normal burst) and determining the modulation mode based on the (fewer) intersymbol phase differences. Determining the modulation mode may include determining that the modulation mode is the GMSK modulation mode (when a sum of absolute values of real parts of the intersymbol phase differences of the symbols is greater than a sum of absolute values of imaginary parts of the intersymbol phase differences of the symbols); and determining that the modulation mode is the 8-PSK modulation mode (when a sum of absolute values of real parts of the intersymbol phase differences of the symbols is less than a sum of absolute values of imaginary parts of the intersymbol phase differences of the symbols).

In some embodiments of the present invention, a blind detection apparatus in a wireless communication receiver includes a phase detector and a modulation mode determiner. The phase detector obtains intersymbol phase differences of a plurality of symbols at intervals of four symbols, the symbols being included in a training sequence code of a received normal burst. The modulation mode determiner determines the modulation mode on a basis of the intersymbol phase differences.

In some embodiments of the present invention, a wireless communication receiver includes an RF receiver, a digital converter, a blind detector and a decoder. The RF receiver receives a radio frequency signal to convert the radio frequency signal into In-phase (I-phase) and Quadrature-phase (Q-phase) analog baseband signals. The digital converter converts the I-phase and the Q-phase channel analog signals into digital signals. The blind detector obtains a plurality (e.g., a sequence) of intersymbol phase differences between symbols (included in a training sequence code of a received normal burst) separated from each other at intervals of four symbols to determine a modulation mode based on the intersymbol phase differences of the symbols. The decoder decodes the digital signal based on the determined modulation mode.

The blind detection method and apparatus may be applied to a receiver of an EGPRS system. In addition, the method and apparatus may be applied to a case of dual mode using GSM/GPRS/EGPRS and UMTS.

Example embodiments of the present invention will become more apparent by describing in detail example embodiments of the present invention with reference to the accompanying drawings.

Specific structural and functional details disclosed herein are merely representative for purposes of describing example embodiments of the present invention. This invention may, however, be embodied in many alternate forms and should not be construed as limited to example embodiments of the present invention set forth herein.

Figure 5:
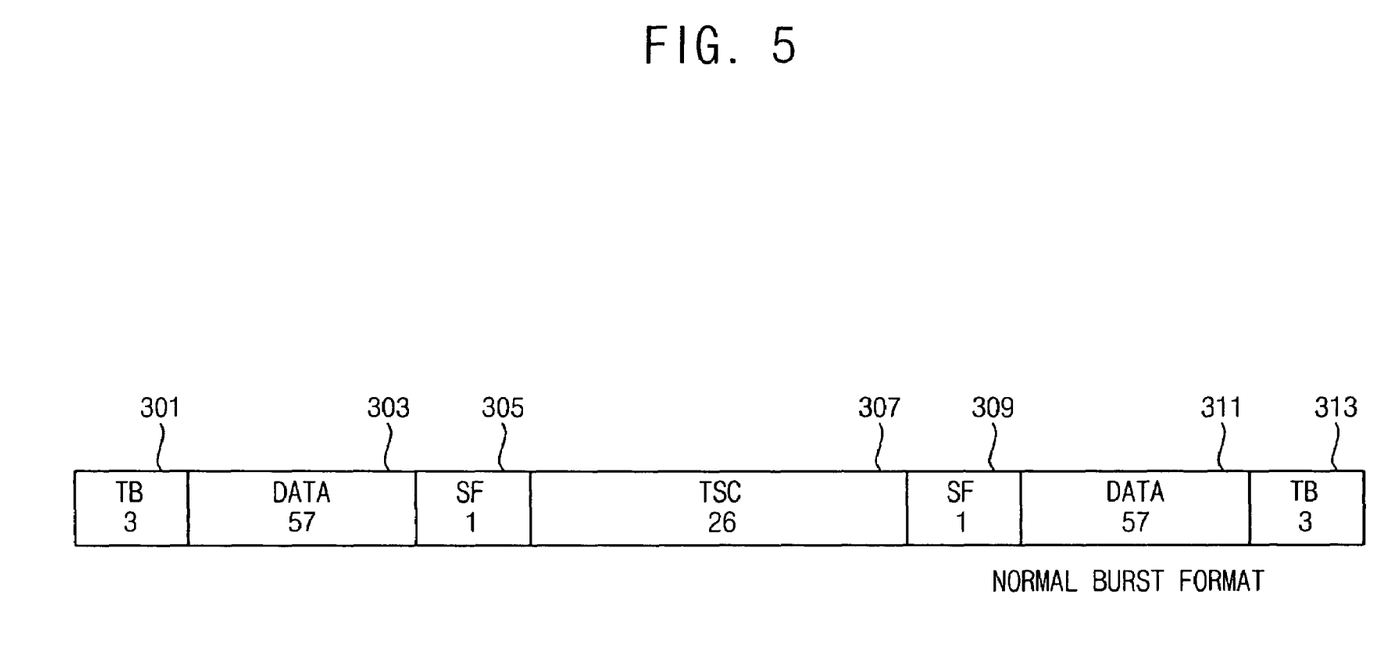
FIG. 5 is a data structure illustrating a normal burst of the digital signals, as defined in the related art standards, received by the receiver of FIG. 2.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention covers all modifications, equivalents, and alternatives falling within the spirit and scope of the invention. Like numbers generally refer to like elements throughout the description of the figures, however in some figures, numbers refer to dimensions, quantities, or sequential indexing. For example, the circled numbers in FIG. 1 refer to numbered symbols in a sequence of 147 symbols. In FIG. 5, the numbers in the boxes are dimensions indicating the number of symbols of the width of each box (e.g., there are twenty-six symbols in the TSC box 307).

It will be understood that, although the terms first, second, etc. may be used herein to describe various elements, these elements should not be limited by these sequences. These terms are used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

DETAILED DESCRIPTION OF THE EXAMPLE EMBODIMENTS

Figure 2:
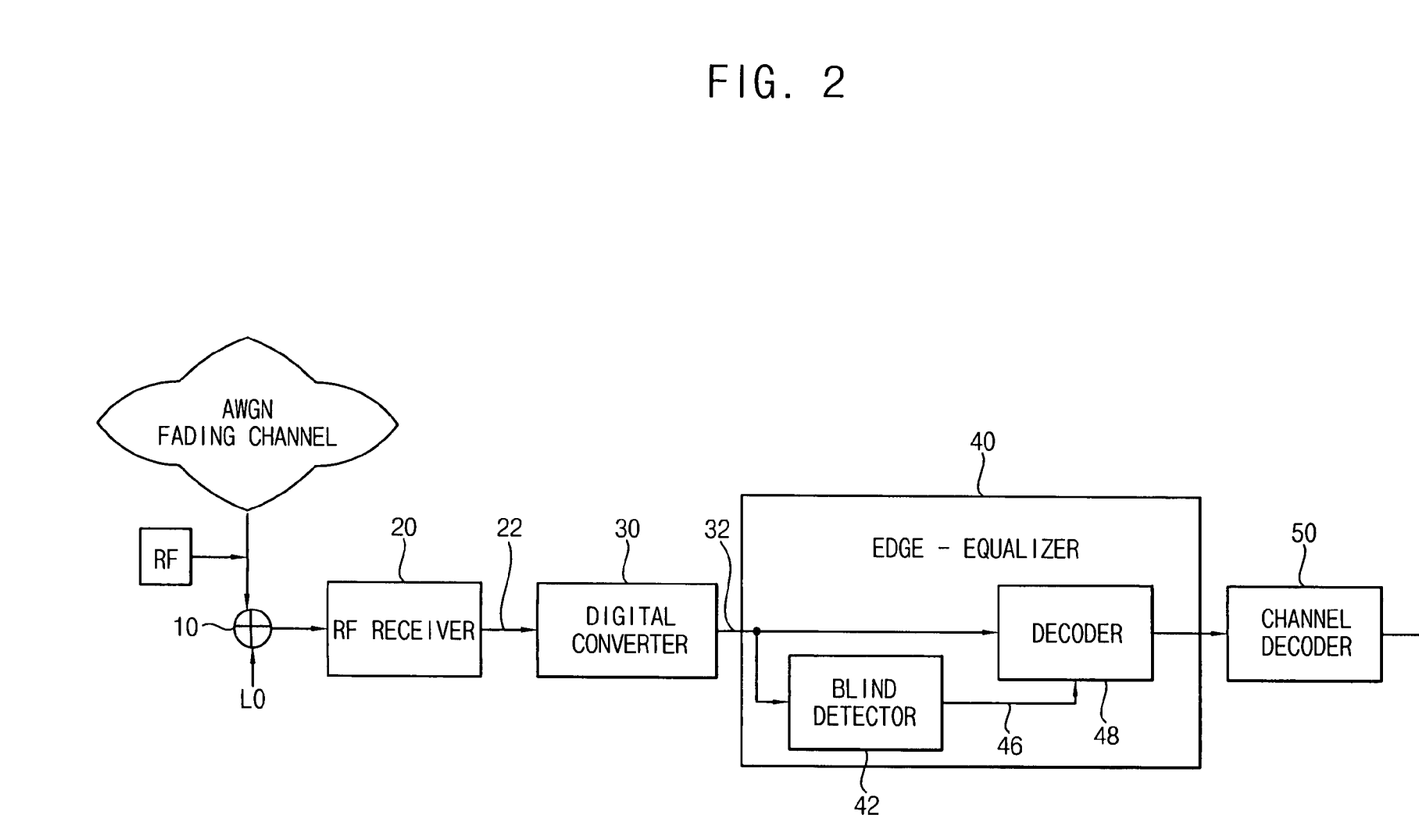
FIG. 2 is a block diagram of a receiver of an EGPRS system, according to an example embodiment of the present invention.

FIG. 2 is a block diagram of a receiver in a EGPRS system, according to an example embodiment of the present invention.

Referring to FIG. 2, the receiver in the EGPRS system includes an RF receiver 20, a digital converter 30, an equalizer 40 and a channel decoder 50.

The RF receiver 20 receives a radio frequency signal RF from an AWGN (Additive White Gaussian Noise) channel through an antenna system, to convert the radio frequency signal RF into In-phase (I) and Quadrature-phase (Q) analog baseband signals 22 (by mixing the radio frequency signal RF with a local carrier signal local oscillator frequency LO).

The digital converter 30 quantizes the baseband signals, (the I and Q channel analog baseband signals 22), to convert the analog baseband signals into digital signals 32, and outputs the digital signals 32 after a low-pass filtering. The digital converter 30 may perform an analog-digital conversion (ADC) after the baseband signals are low-pass filtered.

The EDGE-equalizer 40 includes a blind detector 42 and a decoder 48. The blind detector 42 determines whether a modulation mode of the received radio frequency signal RF is a GMSK modulation mode or an 8-PSK modulation mode. The decoder 48 decodes the digital signal, from which a DC offset is removed, according to the modulation mode determined by the blind detector 42.

The channel decoder 50 performs a channel decoding on an output of the decoder 48.

Figure 3:
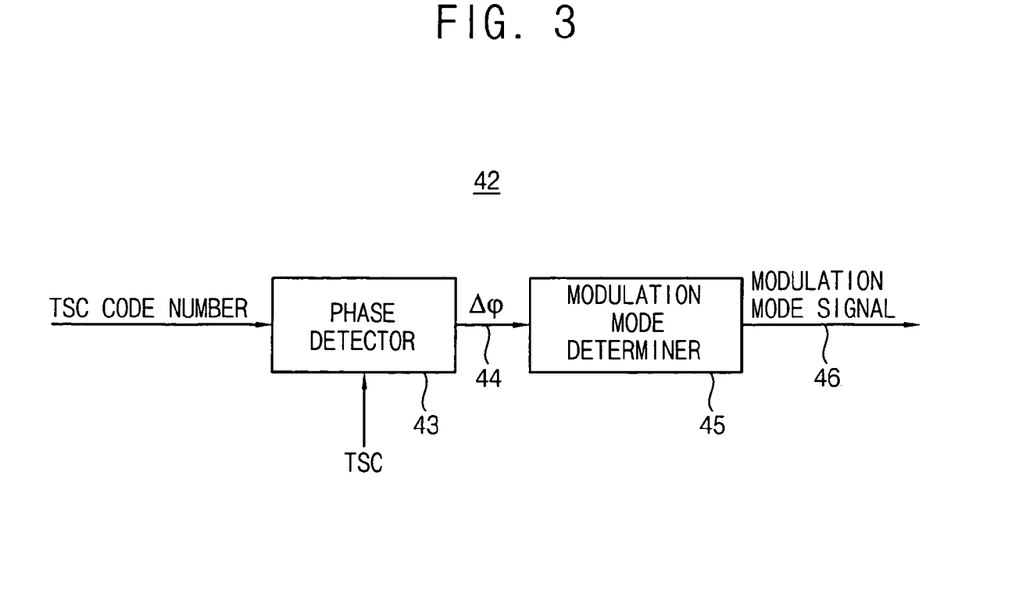
FIG. 3 is a block diagram of the blind detector 42 shown in FIG. 2.

FIG. 3 is a block diagram of the blind detector 42 in the equalizer 40 shown in FIG. 2.

Referring to FIG. 3, the blind detector 42 includes a phase detector 43 and a modulation mode determiner 45.

The phase detector 43 detects intersymbol phase differences $\Delta\phi$ 44 between a plurality of symbols included in a training sequence code (TSC) at intervals of four symbols. The TSC is a well-known code in a GSM system and is included in the digital signals 32 outputted from the digital converter 30 (see FIG. 2 and FIG. 6).

In the GSM system, one frame includes eight time slots, and during one time slot, one normal burst is transmitted. The TSC is positioned at the center of the normal burst and is therefore referred to as a "midamble", rather than a preamble.

The modulation mode determiner 45 determines the received radio frequency modulation method (mode) by using the detected phase differences $\Delta\phi$ to output a modulation mode signal 46 that indicates the modulation mode. In other words, the modulation mode determiner 45 determines whether a modulation method (mode) of the received radio frequency is a GMSK modulation mode or an 8-PSK modulation mode. A more detailed description follows.

Figure 4:
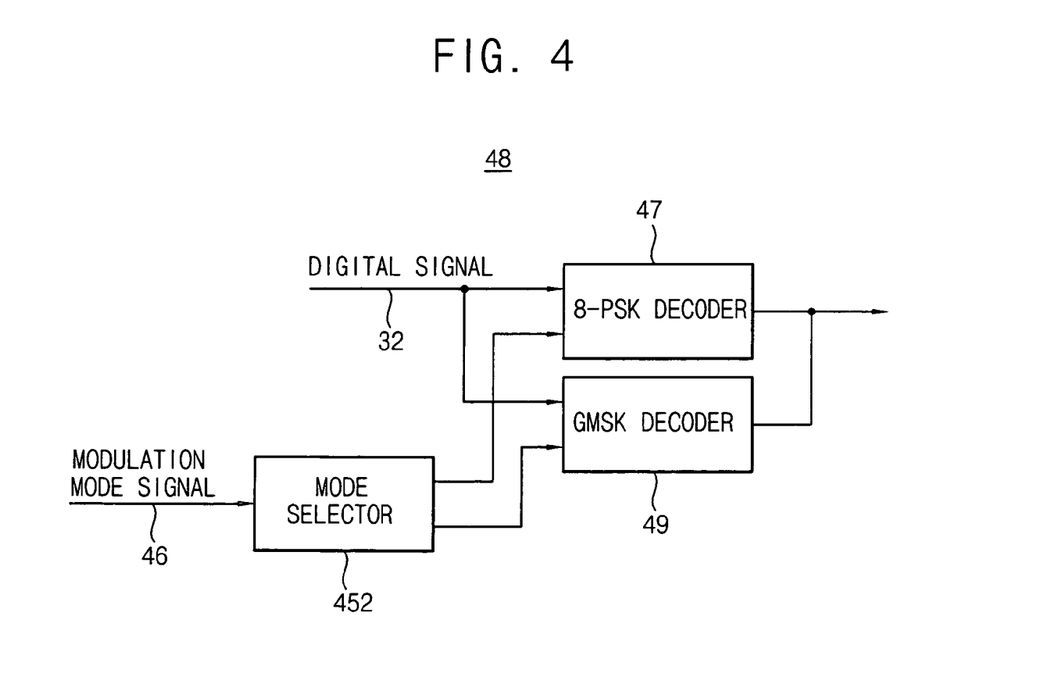
FIG. 4 is a block diagram of the decoder 48 shown in FIG. 2.

FIG. 4 is a block diagram illustrating the decoder 48 in the equalizer 40 in the receiver of FIG. 2.

Referring to FIG. 4, the decoder 48 includes a mode selector 452, an 8-PSK decoder 47 and a GMSK decoder 49.

The mode selector 452 chooses between the 8-PSK decoder 47 and the GMSK decoder 49 based on the modulation mode signal 46.

The GMSK decoder 49 performs a GMSK decoding procedure when a modulation mode is enabled by the modulation mode signal 46, and performs an 8-PSK decoding procedure when the modulation mode is disabled.

For example, in a GMSK decoding procedure when an intersymbol phase difference between two symbols is $\pi/2$, a binary data may be interpreted as a logic '0', and when an intersymbol phase difference between two symbols is $-\pi/2$, a binary data may be interpreted as a logic '1'.

In an 8-PSK decoding procedure, according to a symbol phase, a three-bit data block may be interpreted as one of '111', '011', '010', '000', '001', '101', '100' and '110'.

FIG. 5 is a data structure illustrating the normal burst as defined in the related art standards, of the digital signals 32 received by the receiver of FIG. 2.

Referring to FIG. 5, the normal burst includes a 3-bit TB (Tail Bit) 301, a 57-bit DATA 303, a 1-bit SF (Steeling Flag) 305, a 26-bit TSC (training sequence code) 307, a 1-bit SF, a 57-bit DATA 311 and a 3-bit TB (Tail Bit) 313. The total number of bits of the respective normal burst is 148 bits.

The training sequence code TSC 307 is transmitted together with voice DATA and includes phase reference information, which enables a receiver to perform a coherent demodulation.

Figure 6:
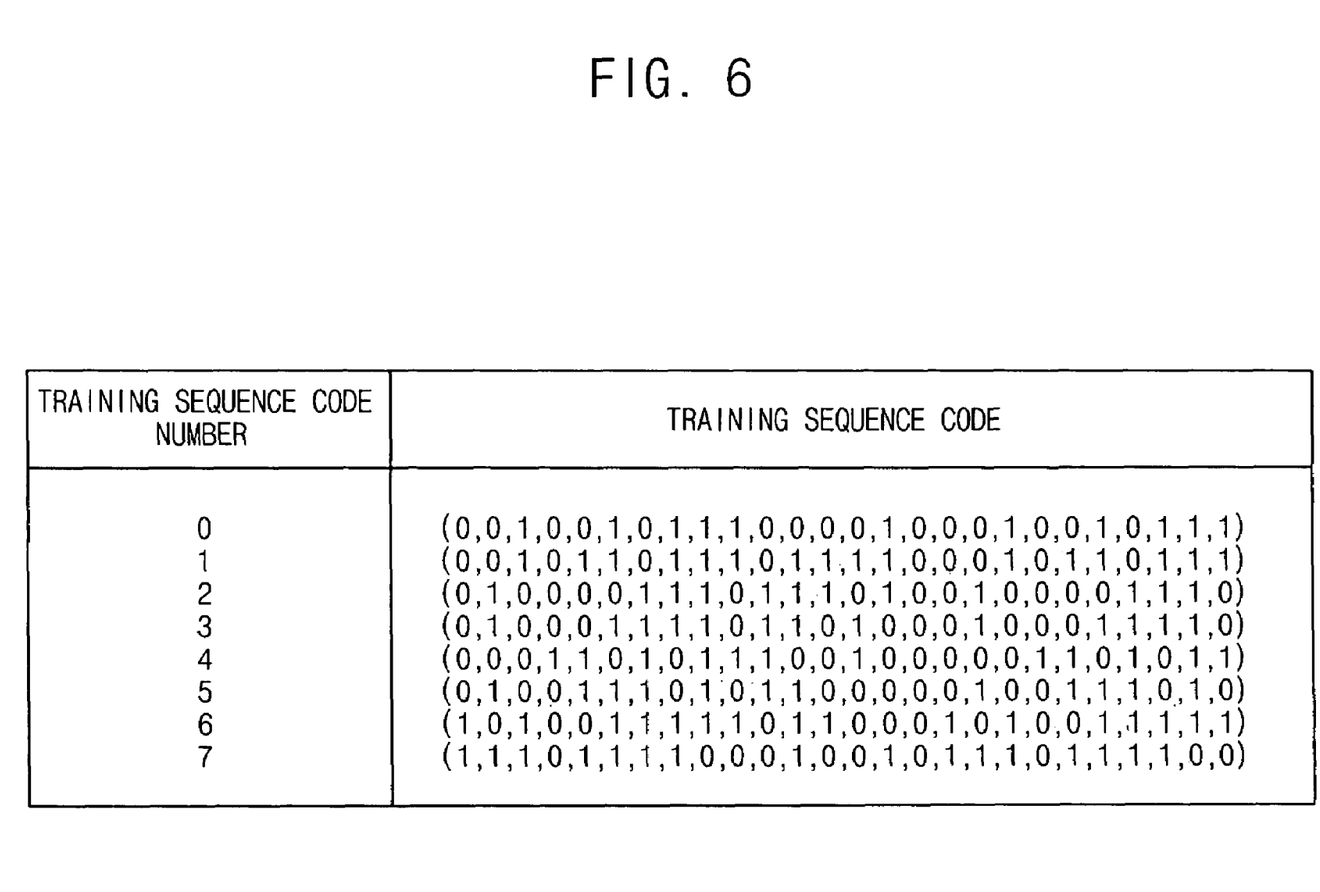
FIG. 6 is a table illustrating the eight training sequence codes numbered 0 through 7, as defined in the related art standards.

FIG. 6 is a table listing the eight training sequence codes, numbered 0 through 7, defined in the related art standards. Eight different training sequence codes are defined in the GSM/EDGE standard, each as a different sequence of zeros and ones. They are enumerated from 0 to 7.

Referring to FIG. 6, each of the eight training sequence codes corresponding to the TSC numbers 0 through 7 is pre-stored in the receiver. The receiver receives the TSC number to perform a blind detection procedure and a demodulation, by using the training sequence bits corresponding to the TSC number.

Figure 7:
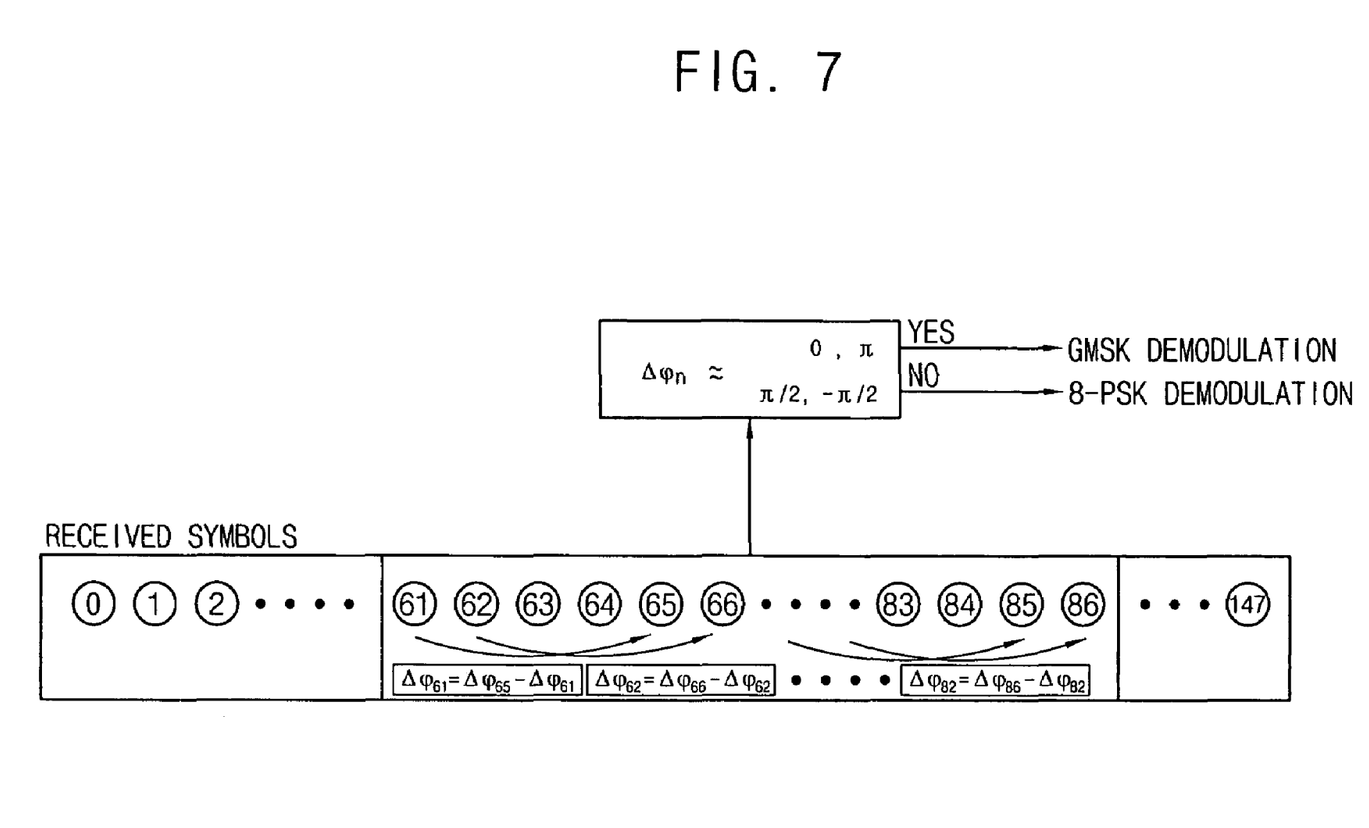
FIG. 7 is a conceptual block diagram illustrating a blind detection method according to an example embodiment of the present invention.

FIG. 7 is a conceptual block diagram illustrating a blind detection method according to an example embodiment of the present invention.

Referring to FIG. 7, the TSC is represented as symbols numbered 61 through 86, and intersymbol phase differences $\Delta\phi$ (at intervals of four symbols) of a plurality of symbols included in the TSC of the received normal burst are respectively represented as a $\Delta\phi_{61}$ through a symbol $\Delta\phi_{82}$.

Herein, a $\Delta\phi_{61}$ represents the intersymbol phase difference between the symbol number 61 and the symbol number 65, and a $\Delta\phi_{82}$ represents the intersymbol phase difference between the symbol number 82 and the symbol number 86. The total number of the phase differences $\Delta\phi$ may be twenty-two or less than twenty-two.

In an EDGE system, the TSC of both a GMSK modulation mode and an 8-PSK modulation mode is the same; however, each symbol of the TSC in the GMSK modulation mode is rotated by $\pi/2$ and each symbol of the TSC in the 8-PSK modulation mode is rotated by $3\pi/8$.

Therefore, each of the intersymbol phase differences $\Delta\phi$ of the symbols included in the TSC at intervals of four symbols is about 0 or $\pi$ in the GMSK modulation, and about $\pi/2$ or $-\pi/2$ in the 8-PSK modulation.

Hereinafter, a blind detector and a blind detection method according to an example embodiment of the present invention are described with reference to FIG. 8 through FIG. 10.

Figure 8:
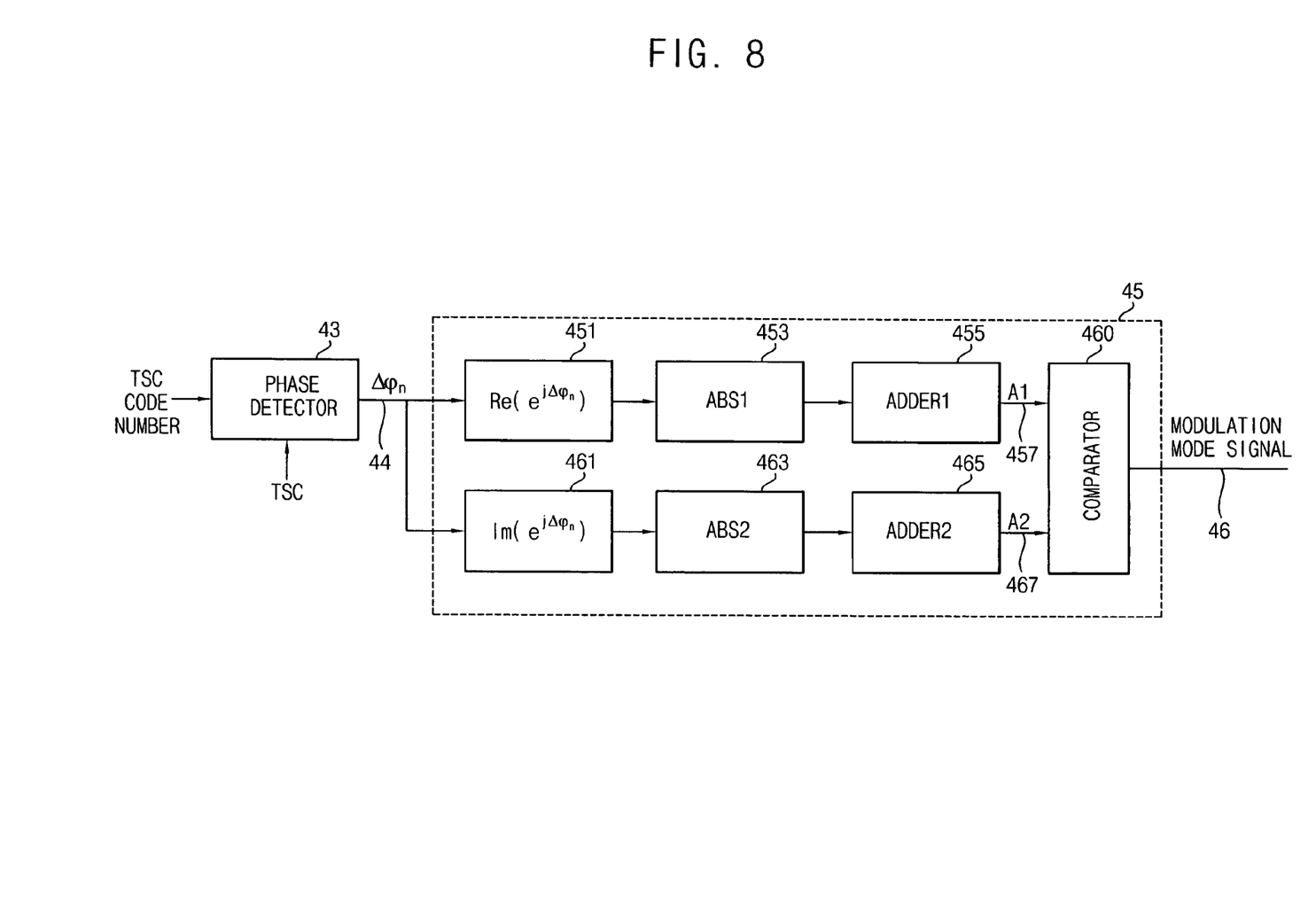
FIG. 8 is a block diagram of the modulation mode determiner 45 in the blind detector 42 of FIG. 3.

FIG. 8 is a block diagram of the modulation mode determiner 45 of the blind detector of FIG. 2.

Referring to FIG. 8, the blind detector includes a phase detector 43 and a modulation mode determiner 45. The modulation mode determiner 45 includes a real part calculator 451, a first absolute value calculator 453, a first adder 455, an imaginary part calculator 461, a second absolute value calculator 463, a second adder 465 and a comparator 460.

Figure 9:
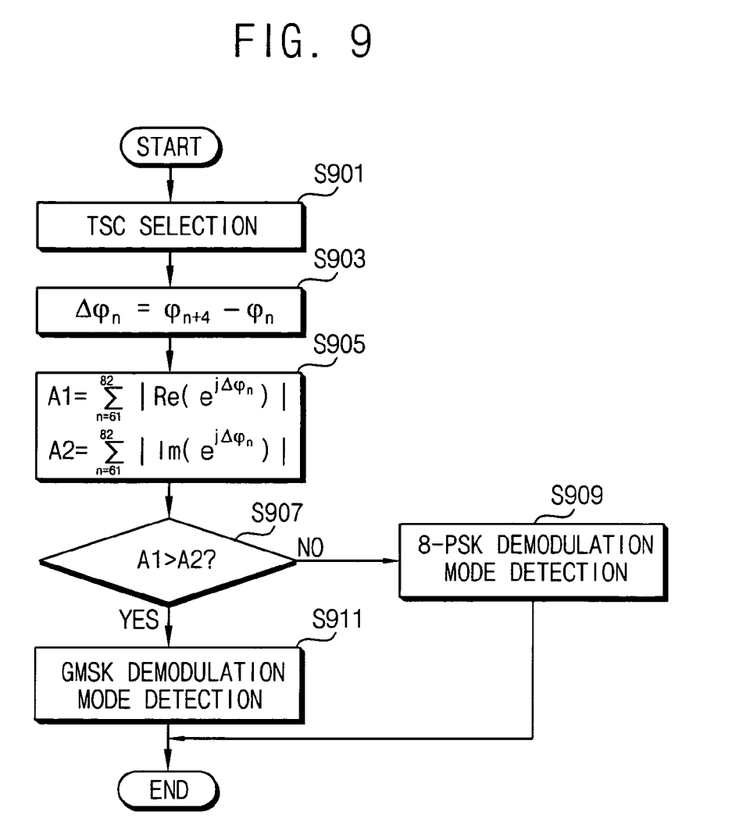
FIG. 9 is a flow chart illustrating a blind detection method according to an example embodiment of the present invention.

FIG. 9 is a flow chart illustrating the blind detection method according to an example embodiment of the present invention.

The phase detector 43 (FIG. 8) selects a TSC corresponding to a received TSC number (step S901), and then obtains (calculates) each of intersymbol phase differences $\Delta\phi$ of a plurality of symbols included in the TSC at intervals of four symbols, that is, $\Delta\phi_n = \Delta\phi_{n+4} - \Delta\phi_n$, (e.g., between a symbol number 61 and a symbol number 65, between a symbol number 62 and a symbol number 66, and so on) (step S903).

The modulation mode determiner 45 calculates a value A1 457 a value A2 468 (step S905). In step S905 the modulation mode determiner 45 calculates the value A1 457 by summing the absolute values of the real part $\text{Re}(e^{i\Delta\phi}{}_n)$ of each of the intersymbol phase differences $\Delta\phi_n$, (i.e., adds together all of the absolute values of the real parts $\text{Re}(e^{i\Delta\phi}{}_n)$. In step S905 the modulation mode determiner 45 also calculates the value A2 468, by summing the absolute values of the imaginary part $\text{Im}(e^{i\Delta\phi}{}_n)$ of each of the intersymbol phase differences $\Delta\phi_n$, (i.e., adds together all of the absolute values of the imaginary parts $\text{Im}(e^{i\Delta\phi}{}_n)$) (step S905).

More particularly, the real part calculator 451 (in the modulation mode determiner 45) calculates a real part $\text{Re}(e^{i\Delta\phi}{}_n)$ of each of the intersymbol phase differences between the symbols included in the TSC at intervals of four symbols. Then, the first absolute value calculator ABS1 453 makes the absolute value of each of the real parts $\text{Re}(e^{i\Delta\phi}{}_n)$. Finally, the first adder 455 adds all of the absolute values of the real parts $\text{Re}(e^{i\Delta\phi}{}_n)$, to produce the value A1 457.

The imaginary part calculator 461 calculates the imaginary part $\text{Im}(e^{i\Delta\phi}{}_n)$ of all the intersymbol phase differences of the symbols included in the TSC at intervals of four symbols. Then, the second absolute value calculator ABS2 463 makes the absolute value of the imaginary parts $\text{Im}(e^{i\Delta\phi}{}_n)$. Finally, the second adder 465 adds all of the absolute values of the imaginary parts $\text{Im}(e^{i\Delta\phi}{}_n)$ to produce the value A2 467.

The comparator 460 compares the value A1 with the value A2 to generate a modulation mode signal 46 (step S907).

When the value A1 is greater than the value A2, the modulation mode signal indicating the GMSK modulation is outputted from the comparator 460 (step S911), but when the value A1 is less than the value A2, the modulation mode signal indicating the 8-PSK modulation is outputted from the comparator 460 (step S909).

Figure 10:
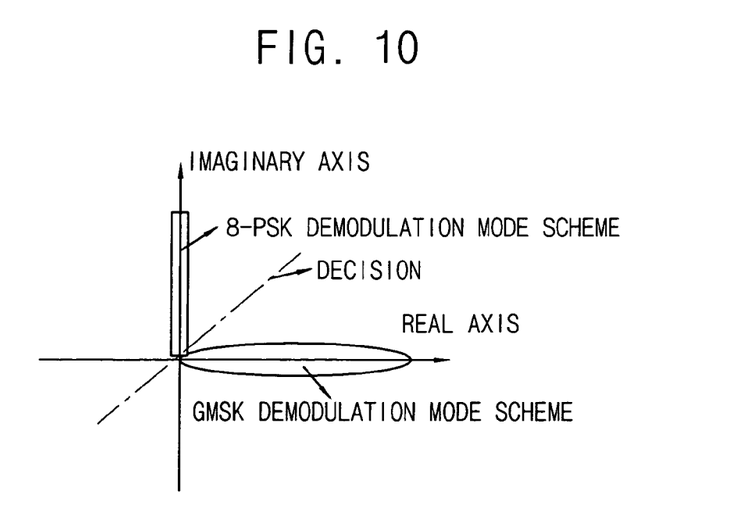
FIG. 10 is a graph illustrating a determination between a GMSK modulation mode and a 8-PSK modulation mode, that is applied to the blind detection method of FIG. 9.

FIG. 10 is a graph illustrating the determination between the GMSK modulation mode and the 8-PSK modulation mode, which is applied to the blind detection of FIG. 9.

Referring to FIG. 10, in the GSMK modulation, the intersymbol phase differences of the symbols included in the TSC at intervals of four symbols have a value of about 0 or $\pi$ (on the real axis) and in the 8-PSK modulation, intersymbol phase differences of the symbols included in the TSC at intervals of four symbols have a value of about $\pi/2$ or $-\pi/2$ (on the imaginary axis).

Therefore, in the GSMK modulation, the value A1 is greater than the value A2 because the intersymbol phase differences of the symbols included in the TSC at intervals of four symbols have a value on the real axis, and in the 8-PSK modulation, the value A1 is less than the value A2 because the intersymbol phase differences of the symbols included in the TSC at intervals of four symbols have the value on the imaginary axis.

As described above, the blind detector according to above example embodiments of the present invention determines the modulation mode by using the intersymbol phase differences of the symbols included in the TSC at intervals of four symbols. Therefore, the number of calculations performed for the blind detection may be decreased (e.g., by about 75 percent), and as a result, the time needed for performing the blind detection may be reduced. In addition, a hardware design for the blind detection may be simplified.

While the example embodiments of the present invention have been described in detail, it should be understood that various changes, substitutions and alterations may be made herein without departing from the scope of the invention. In the following claims, the variables n, k, j, r, and q are integers.

What is claimed is:

1. A method of blind detection of a transmitter's modulation mode for a wireless communication receiver, comprising:
   determining the modulation mode used by the transmitter based on a plurality of intersymbol phase differences between symbols separated from each other at an interval of four symbols, the symbols being within a training sequence code of a received normal burst, by comparing the sum of absolute values of real parts of the intersymbol phase differences with the sum of absolute values of imaginary parts of the intersymbol phase differences.

2. The method of claim 1, further comprising:
   calculating the intersymbol phase differences between the symbols separated from each other at an interval of four symbols.

3. The method of claim 2, further comprising:
   selecting the training sequence code corresponding to a training sequence code number of the received normal burst.

4. The method of claim 2, wherein calculating the intersymbol phase differences comprises:

calculating the intersymbol phase difference between the (m+r)th symbol and the (m+r+4)th symbol of a received normal burst; and repeating, q more times, the step of calculating the intersymbol phase difference between an (m+r)th symbol and the (m+r+4)th symbol of a received normal burst, while r is incremented from 0 to q.

5. The method of claim 4, wherein m is 61 and q is 21.

6. The method of claim 4, wherein determining the modulation mode comprises determining the modulation mode by comparing the sum of (q+1) absolute values of real parts of the (q+1) calculated intersymbol phase differences with the sum of (q+1) absolute values of imaginary parts of the (q+1) calculated intersymbol phase differences.

7. The method of claim 4, wherein determining the modulation mode comprises determining the modulation mode among a GMSK modulation mode and an 8-PSK modulation mode, based on the (q+1) calculated intersymbol phase differences.

8. The method of claim 7, wherein determining the modulation mode comprises:
   determining that the modulation mode is the GMSK modulation mode when each of the (q+1) intersymbol phase differences has a value of about 0 or about π; and
   determining that the modulation mode is the 8-PSK modulation mode when each of the (q+1) intersymbol phase differences has a value of about π/2 or about −π/2.

9. The method of claim 7, wherein determining the modulation mode comprises:
   determining that the modulation mode is the GMSK modulation mode when the sum of (q+1) absolute values of real parts of the intersymbol phase differences is greater than the sum of (q+1) absolute values of imaginary parts of the intersymbol phase differences; and
   determining that the modulation mode is the 8-PSK modulation mode when the sum of the (q+1) absolute values of the real parts of the intersymbol phase differences is less than the sum of the (q+1) absolute values of the imaginary parts of the intersymbol phase differences.

10. The method of claim 1, wherein the wireless communication receiver includes an EGPRS (Enhanced General Packet Radio Service) receiver.

11. A method of blind detection of a transmitter's modulation mode, in an EGPRS receiver, comprising:
    calculating intersymbol phase differences between symbols separated from each other at an interval of four symbols, the symbols being within a training sequence code of a received normal burst; and
    determining a modulation mode used by the transmitter based on the intersymbol phase differences by comparing the sum of absolute values of real parts of the intersymbol phase differences with the sum of absolute values of imaginary parts of the intersymbol phase differences.

12. The method of claim 11, further comprising:
    selecting the training sequence code corresponding to a training sequence code number of the received normal burst.

13. The method of claim 11, wherein calculating the intersymbol phase differences comprises:
    calculating the intersymbol phase difference between the (m+r)th symbol and the (m+r+4)th symbol of a received normal burst; and
    repeating, q more times, the step of calculating the intersymbol phase difference between an (m+r)th symbol and the (m+r+4)th symbol of a received normal burst, while r is incremented from 0 to q.

14. The method of claim 13, wherein m is 61 and q is 21.

15. The method of claim 13, wherein determining the modulation mode comprises determining the modulation mode by comparing the sum of (q+1) absolute values of real parts of the (q+1) calculated intersymbol phase differences with the sum of (q+1) absolute values of imaginary parts of the (q+1) calculated intersymbol phase differences.

16. The method of claim 13, wherein determining the modulation mode comprises determining the modulation mode among a GMSK modulation mode and an 8-PSK modulation mode, based on the (q+1) calculated intersymbol phase differences.

17. The method of claim 16, wherein determining the modulation mode comprises:
    determining that the modulation mode is the GMSK modulation mode when each of the (q+1) intersymbol phase differences has a value of about 0 or about π; and
    determining that the modulation mode is the 8-PSR modulation mode when each of the (q+1) intersymbol phase differences has a value of about π/2 or about −π/2.

18. The method of claim 16, wherein determining the modulation mode comprises:
    determining that the modulation mode is the GMSK modulation mode when the sum of (q+1) absolute values of real parts of the intersymbol phase differences is greater than the sum of (q+1) absolute values of imaginary parts of the intersymbol phase differences; and
    determining that the modulation mode is the 8-PSR modulation mode when the sum of the (q+1) absolute values of the real parts of the intersymbol phase differences is less than the sum of the (q+1) absolute values of the imaginary parts of the intersymbol phase differences.

19. A blind detection apparatus in a wireless communication receiver, comprising:
    a phase detector configured to measure a plurality of intersymbol phase differences between symbols separated from each other at an interval of four symbols, the symbols being within a training sequence code of a received normal burst; and
    a modulation mode determiner configured to determine a modulation mode based on the plurality of intersymbol phase differences by comparing the sum of absolute values of real parts of the intersymbol phase differences with the sum of absolute values of imaginary parts of the intersymbol phase differences.

20. The apparatus of claim 19, wherein the phase detector selects the training sequence code corresponding to a training sequence code number of the received normal burst.

21. The apparatus of claim 19, wherein determining the modulation mode comprises determining the modulation mode among a GMSK modulation mode and an 8-PSK modulation mode, based on the obtained intersymbol phase differences.

22. The apparatus of claim 21, wherein the modulation mode determiner comprises:
    determining that the modulation mode is the GMSK modulation mode when each of the intersymbol phases differences is about 0 or about π; and
    determining that the modulation mode is the 8-PSK modulation mode when each of the intersymbol phases differences is about π/2 or about −π/2.

23. The apparatus of claim 21, wherein the modulation mode determiner comprises:
    determining that the modulation mode is the GMSK modulation mode when the sum of absolute values of real parts of the intersymbol phase differences is greater than the sum of absolute values of imaginary parts of the intersymbol phase differences; and determining that the modulation mode is the 8-PSK modulation mode when the sum of the absolute values of the real parts of the intersymbol phase differences is less than the sum of the absolute values of the imaginary parts of the intersymbol phase differences.

24. The apparatus of claim 23, wherein the modulation mode determiner comprises:

a real part calculator configured to calculate the real part of each of the intersymbol phase differences;

a first absolute value calculator configured to make the absolute value of each of the real parts;

a first adder configured to add all of the real parts, to produce a first value;

an imaginary part calculator configured to calculate the imaginary part of each of the intersymbol phase differences;

a second absolute value calculator configured to make the absolute value of each of the imaginary parts;

a second adder configured to add all of the imaginary parts, to produce a second value; and a comparator configured to compare the first value with the second value.

25. The apparatus of claim 19, wherein the wireless communication receiver includes an EGPRS receiver.

26. A wireless communication receiver, comprising:

an RF receiver configured to receive a radio frequency signal and to convert the radio frequency signal into b-phase (I-phase) and Quadrature-phase (Q-phase) analog baseband signals;

a digital converter configured to convert the I-phase and the Q-phase analog baseband signals into digital signals;

a blind detector configured to measure a plurality of intersymbol phase differences between symbols separated from each other at an interval of four symbols, among symbols in a training sequence code of a received normal burst and to determine a modulation mode based on the intersymbol phase differences by comparing the sum of absolute values of real parts of the intersymbol phase differences with the sum of absolute values of imaginary parts of the intersymbol phase differences; and a decoder configured to decode the digital signal based on the determined modulation mode.

27. The receiver of claim 26, wherein the blind detector comprises:

a phase detector configured to measure the intersymbol phase differences between the symbols in the training sequence code of the received normal burst, at intervals of four symbols; and a modulation mode determiner configured to determine the modulation mode based on the intersymbol phase differences.

28. The receiver of claim 27, wherein the modulation mode determiner is configured to determine the modulation mode among a GMSK modulation mode and an PSK modulation mode, based on the intersymbol phase differences.

29. The receiver of claim 28, wherein the modulation mode determiner comprises:

computation circuits configured to determine that the modulation mode is the GMSK modulation mode when the sum of absolute values of real parts of the intersymbol phase differences is greater than the sum of absolute values of imaginary parts of the intersymbol phase differences; and to determine that the modulation mode is the 8-PSR modulation mode when the sum of the absolute values of the real parts of the intersymbol phase differences is less than the sum of the absolute values of the imaginary parts of the intersymbol phase differences.

30. The receiver of claim 26, wherein the wireless communication receiver includes an EGPRS receiver.

* * * * *